June 6, 1961 H. E. BARNHART ET AL 2,987,565
SEALED THERMOCOUPLE
Filed June 8, 1959

INVENTORS
HARRY E. BARNHART
BY CLINTON O. DERR

Bauer and Seymour
ATTORNEYS

United States Patent Office 2,987,565
Patented June 6, 1961

2,987,565
SEALED THERMOCOUPLE
Harry E. Barnhart and Clinton O. Derr, Sidney, N.Y., assignors to The Bendix Corporation, a corporation of Delaware
Filed June 8, 1959, Ser. No. 818,762
9 Claims. (Cl. 136—4)

This invention relates to a sealed thermocouple adapted for the measurement of a wide range of temperatures, including highly elevated temperatures.

The invention has among its objects the provision of an improved, sealed, thermocouple.

Another object of the invention lies in the provision of a sealed thermocouple which is characterized by its strength and durability, and by the security of its seal.

Still a further object of the invention lies in the provision of a sealed thermocouple which preserves the continuity of the different metals on the two sides of the thermocouple circuit, and as a result is capable of detecting temperatures with a high degree of accuracy.

The above and further objects or novel features of the invention will more fully appear from the following description when the same is read in connection with the accompanying drawings. It is to be expressly understood, however, tha the drawings are for the purpose of illustration only and are not intended as a definition of the limits of the invention.

In the drawings, wherein like reference characters refer to like parts throughout the several views, FIG. 1 is a view in longitudinal, generally axial section through an illustrative embodiment of thermocouple made in accordance with the invention, an intermediate portion of the thermocouple device being broken away for economy of space, certain of the parts being shown in elevation;

There is frequent occasion for the sensing and/or measurement of high temperatures and for transmitting the observations or measurements from the high temperature zone to a recording or observing station. An example of such installation is with a jet or ram jet engine, wherein it is desired to detect the temperature at one or more zones in the combustion chamber. Such observations are conveniently made by thermocouple probes which extend into the various zones of the combustion chamber, the leads from the thermocouple probes extending to a millivoltmeter at a convenient location, such as the instrument panel of an airplane.

Difficulty has been experienced with such installations because of the tendency of the noxious or poisonous gases in the combustion zone to leak outwardly through the opening in the engine housing past the lead wires to the thermocouple probes. Various attempts have been made to seal the lead wires to the housing of the thermocouple device which in turn was sealed to the housing of the engine. Because of the differences in coefficients of expansion of the parts, however, and the high temperatures encountered during use, prior sealed thermocouples have not been altogether satisfactory, particularly from the points of view of ruggedness of construction and accuracy of observation. The latter difficulty arose primarily because, with prior constructions, it was not possible to maintain a continuity of one thermocouple metal throughout each of the respective sides of the thermocouple circuit. Thus, with prior constructions, it was necessary to interpose parts of different metals in the portion of the thermocouple leads which were sealed to the thermocouple housing.

Figure 3:
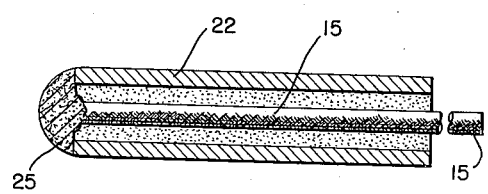
FIG. 3 is a fragmentary view generally in axial section through one of the thermocouple probes of the device of FIGS. 1 and 2 in an intermediate stage of its assembly.
Figure 4:
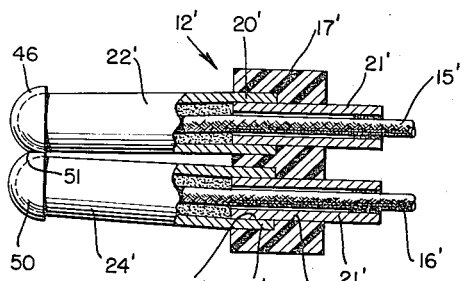
FIG. 4 is a view similar to FIG. 2 of an alternative construction of thermocouple probe assembly.
Figure 5:
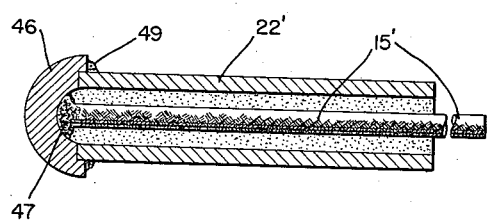
FIG. 5 is a view generally in axial section of one of the thermocouple probes of the assembly of FIG. 4 in an intermediate stage of the process by which the probe is made.

The thermocouple device of the present invention is simple in construction, easily and economically assembled, and preserves the continuity of the respective thermocouple metals throughout the respective sides of the thermocouple circuit, while still making possible a strong impermeable seal between the housing of the device and the thermocouple leads. The sealed thermocouple of the present invention will be more readily understood upon consideration of the two illustrative embodiments thereof shown in the drawings, the first of which is shown in FIGS. 1–3, inclusive, and the second of which is shown in FIGS. 4 and 5.

Figure 1:
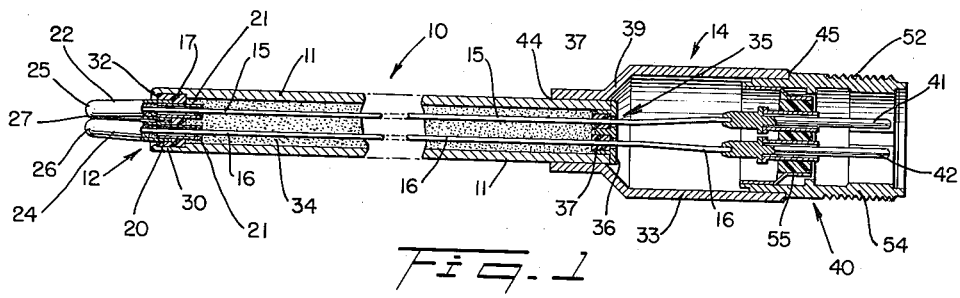

The thermocouple device shown in FIG. 1 is designated generally by the reference character 10. Device 10 has an elongated tubular housing 11 made, for example, of a stainless steel tube. A probe assembly, generally designated 12, is seated within and sealed to the forward end of the tubular housing 11. In the embodiment shown, there is a sealing and circuit-connecting part, generally designated 14, sealingly attached to the rear end of the housing 11.

In the illustrative thermocouple, one side of the thermocouple circuit, shown at the top in FIG. 1, presents a continuous path, for example, of "Chromel" metal, and the other side of the circuit, shown at the bottom in FIG. 1, presents a continuous path, for example, of "Alumel" metal. Thus, the upper wire 15 is made of Chromel and the lower wire 16 is made of Alumel. Wires 15 and 16 are connected to sheaths made of a corrosion resistant metal such as Inconel or stainless steel. Such sheaths form parts of the thermocouple probe 12 at the forward end of the housing 11. Wires 15 and 16 are connected, respectively, to connector pins 41 and 42 made, respectively, of Chromel and Alumel.

Figure 2:
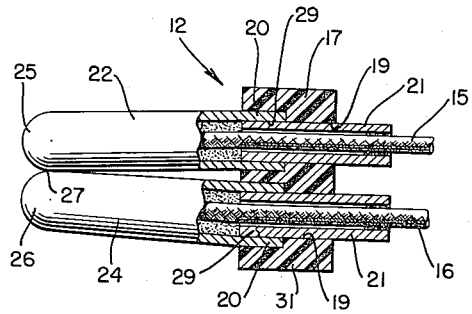
FIG. 2 is a view on an enlarged scale of the thermocouple probe assembly shown at the left hand end of the device in FIG. 1.

The thermocouple probe 12 is shown more particularly in FIG. 2. Such assembly comprises a ceramic insulator 17, made, for example, of alumina. Insulator 17 has two laterally spaced generally parallel holes 19 therethrough, the forward ends of such holes being counterbored at their forward ends 20. Since the two probes are essentially the same in construction, only the probe including wire 15 and sheath 22 need be discussed in detail. The wire 15 extends through hole 19 and generally centrally within the sheath to the forward end of which it is connected by fused metal 25, as shown in FIG. 3. The rear, open end of sheath 22 is seated in the counterbore 20. A tube 21 of a suitable metal, such as "Kovar" is snugly telescoped within hole 19 in insulator 17 and within the inner surface of the rear end of sheath 22. The sheath 22 is sealed to tube 21 as by being brazed thereto at zone 29, tube 21 being sealed to the wall of hole 19, likewise as by being brazed thereto. The sheaths 22 and 24 are bent toward each other in a forward direction so that their forward ends are in contact. Preferably the fused Chromel metal 25 and the fused Alumel metal 26 are secured together by fusion welding at 27.

The resulting sub-assembly 12 is mounted in a seat 30 at the forward end of housing 11 and is sealed thereto in a manner to be described. When the sub-assembly has been thus mounted, the housing 11 and the assembly 12 present a gas impervious structure, since the tubes 21 are sealed to the respective sheaths 22 and 24, the tubes 21 are sealed to insulator 17, and insulator 17 is sealed to housing 11. In the illustrative embodiment the device 14, attached to the rear end of the housing includes a connector part 40 having a construction generally the same as that shown in the application of Barnhart, Serial No. 714,740, filed February 12, 1958. Such connector part, and the adaptor member 33 employed therewith, serve completely to seal the rear end of the housing 11 from the atmosphere, so that the thermocouple device shown is completely sealed.

The thermocouple device 10 may conveniently be made as follows: A convenient length of tube 11 is prepared, and the annular seat 30, in the form of a counterbore, is formed in the forward end thereof. Lengths of Chromel and Alumel wire somewhat in excess as thus shown at 15 and 16 are then cut. The forward ends of wires 15 and 16 are telescoped into tubular sheaths 22 and 24, respectively, and are attached and sealed thereto by fusing the forward end of each wire to its tube without the addition of any further metal. The outer annular surface 31 of insulator 17 and the walls of holes 19 therethrough, are metallized in a conventional manner. The rear open ends of tubes 22 and 24 are telescoped within the counterbores 20 in insulator 17 to the position shown in FIG. 2, and Kovar tubes 21 are telescoped over the respective wires 15 and 16 and pushed into the holes 19 in the insulator. The outer forward ends of sheaths 22 and 24 are bent toward each other so that they contact, and are then secured together by melting the confronting contacting portions of metals 25 and 26 as by an electric arc to form the fused zone 27.

The assembly 12 is then mounted in seat 30 in housing 11 with the wires 15 and 16 extending rearwardly through housing 11, and the forward end of housing 11 is bent or rolled over the edge of the insulator as shown at 32. With the wires 15 and 16 held in the extended positions shown, the space within the housing 11 and around the wires is filled with a powdered refractory material 24 such as magnesia. Following this, there is applied to the rear of housing 11 a transverse member 35 which seals the housing to a substantial extent and prevents the escape therefrom of the powdered refractory 24.

Member 35 is made up of a radially flanged metal plate 36 having a central portion which projects forwardly into the rear end of housing 11. Such central portion of member 36 has two laterally spaced bores therein into which are set cylindrical ceramic refractory insulators or bushings 37 through which the wires 15 and 16 snugly extend. The end member 35 is secured to the rear end of housing 11 by an annular weld 39 between the flange of member 36 and the housing. Following the formation of weld 39, the assembly consisting of housing 11, sub-assembly 12, and rear member 35, is charged into a brazing furnace having a non-oxidizing atmosphere such as hydrogen, wherein the assembly is heated at such temperature and for a sufficient time to braze tubes 21 to their respective sheaths 22 and 24 at zones 29, to braze tubes 21 to the metallized walls of holes 19, and to braze the metallized surface 31 of insulator 17 to the seat 30 in housing 11.

The thus described thermocouple device is sealed at its forward end and may be used, with appropriate mounting and circuit-connecting means, in a variety of applications. The terminal assembly 14 is only one of various different means by which thermocouple device may be connected to an output circuit and/or may be completely sealed. In completing the assembly of the device shown in FIG. 1, the stepped annular adaptor member 33, which may be made, for example, of stainless steel, is telescoped over the housing 11 and is slid an appreciable distance to the left. The connector part 40 is then presented to the ends of wires 15 and 16, which will have been cut to an appropriate length, and suitable connections will be made between the inner ends of pin contacts 41 and 42 and the wires 15 and 16, respectively. The adaptor member 33 will now be slid to the right so that its right hand end is telescoped over the left hand portion of the housing of connector part 40. The adaptor 33 may now be welded to the housing 11, and to the housing 54 of connector part 40, as by annular welds at 44 and 45, respectively.

The resulting structure is completely sealed both from the high temperature zone into which the forward, probe end of the device extends, and from the atmosphere. The sealing of the probe end of the device has been described above. As will be clear in FIG. 1, the contact pins 41 and 42 of connector 40 are sealed to a ceramic insert 52 which, in turn, is sealed to the housing 54 of the connector part 40 by the annular resilient diaphragm 55. Such structure, in conjunction with the above described annular welds between the adaptor 33, the housing 11, and the connector shell 54, complete the sealing of the rear end of the thermocouple device from the atmosphere.

FIGS. 4 and 5, showing an alternative construction of the probe sub-assembly of the thermocouple device. Such assembly is identical with that shown in FIGS. 2 and 3 with the exception of the manner of closing and sealing the forward ends of the sheaths of the probes. Consequently, parts of the sub-assembly shown in FIGS. 4 and 5, which are the same as those shown in FIGS. 2 and 3, are designated by the same reference characters with an added prime. The sheaths 22' and 24', which may be made of Inconel or stainless steel, for example, are closed at their forward ends by preformed caps 46 and 50, which are made of the same metal as wire 15', on the one hand, and wire 16', on the other. The wires may be conveniently attached to the central inner surfaces of the respective caps by fusing the wire thereto in the manner shown at 47 in FIG. 5, following which the wire will be telescoped through the tube, and the cap will be sealed to the tube by a fusion weld, such as that shown at 49 in FIG. 5. After the respective probes have been thus assembled, they will be mounted in insulator 17' as shown in FIG. 4, will be bent so that their forward ends are substantially in contact, and thereafter will be fusion welded together at zone 51. The rest of the thermocouple assembling operation, assuming that sub-assembly 12' is to be used in a device such as that shown at 10 in FIG. 1, will be the same as that which has been described above in connection with the thermocouple device of FIGS. 1, 2, and 3.

The advantages of the sealed thermocouple of the invention will be apparent from the above. The continuity of the respective metals on the two sides of the thermocouple circuit is completely preserved, at the same time, the forward, probe end of the device is completely sealed. The Kovar tubes 21 readily seal to the insulator 17 and to sheaths 22 and 24. Tubes 21 preserve the seal between the insulator and the sheaths, without imposing undue strains on the parts, over a wide range of operating temperatures including highly elevated temperatures. The sheaths 22 and 24, besides serving to seal the probes, have valuable mutually bracing and strengthening functions, which prevent fatigue of the probes by undue vibration.

Although only a limited number of embodiments of the invention have been illustrated in the accompanying drawings and described in the foregoing specification, it is to be especially understood that various changes, such as in the relative dimensions of the parts, materials used and the like, as well as the suggested manner of use of the apparatus of the invention, may be made therein without departing from the spirit and scope of the invention as will now be apparent to those skilled in the art.

What is claimed is:

1. A high temperature thermocouple, comprising an elongated housing, a ceramic insulator sealed to the housing adjacent the forward end thereof, two probes of different metals mounted in spaced relation on the insulator and extending forwardly from the insulator, each of said probes comprising a tubular metal sheath having its forward end closed, forward end portions of the sheaths of the probes being in contact, the rear ends of the sheaths being open and sealed to the insulator, each probe having a conductor of the same metal as its sheath connected to the interior of the sheath and extending through the insulator and rearwardly within the housing.

2. A thermocouple as defined in claim 1, wherein the interior of the housing is sealed, and comprising means on the housing and appreciably spaced from the forward end thereof for sealing the conductors to the housing.

3. A high temperature thermocouple, comprising an elongated housing, a ceramic insulator disposed across and sealed to the housing adjacent the forward end thereof, two probes of different metals mounted in spaced relation on the insulator and extending forwardly from the insulator, each of said probes comprising a tubular metal sheath having its forward end closed, the closed forward ends of the sheaths of the probes being in contact, the rear ends of the sheaths being open and sealed to the insulator, each probe having a lead wire of the same metal as its sheath connected to the interior of the sheath and extending through the insulator and rearwardly within the housing.

4. A thermocouple as defined in claim 3, wherein the lead wires are connected to the sheaths by fused metal masses, and said metal masses are connected by being partially fused together.

5. A high temperature thermocouple, comprising an elongated housing, a ceramic insulator disposed across and sealed to the forward end of the housing, two probes of different metals mounted in spaced relation on the insulator and extending forwardly from the insulator, each of said probes comprising a tubular metal sheath having its forward end closed, the closed forward ends of the sheaths of the probes being in contact, the rear ends of the sheaths being open and sealed to the insulator, each probe having a lead wire of the same metal as its sheath connected to the closed forward end of the sheath and extending generally centrally thereof through the insulator and rearwardly within the housing.

6. A thermocouple as defined in claim 5, wherein the closed forward end of each of the sheaths is formed from as mass of metal melted in situ from the forward end of the lead wire and the forward end of the respective sheath.

7. A thermocouple as defined in claim 6, wherein the metal masses at the forward ends of the sheaths of the probes are connected by being partially fused together.

8. A thermocouple as defined in claim 5, wherein the closed forward end of each of the sheaths is in the form of a preformed cap made of the same metal as the respective wire and sheath, the wire being connected to the cap and the cap being connected to the sheath by fused metal bonds.

9. A thermocouple as defined in claim 8, wherein the caps on the sheaths lie adjacent each other and are connected by a fused metal bond.

References Cited in the file of this patent

UNITED STATES PATENTS 2,335,358     Ray _____ Nov. 30, 1943

FOREIGN PATENTS 619,652     Germany _____ Aug. 18, 1931

OTHER REFERENCES

Alcock: Journal of Scientific Instruments, 1928, vol. 5, pages 177–183.